United States Patent
Wu et al.

(10) Patent No.: US 9,425,932 B2
(45) Date of Patent: Aug. 23, 2016

(54) METHOD FOR DETECTING DOWNLINK CONTROL CHANNEL, USER EQUIPMENT, AND BASE STATION

(75) Inventors: Xin Wu, Shenzhen (CN); Bo Dai, Shenzhen (CN); Yijian Chen, Shenzhen (CN); Zhisong Zuo, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 14/236,284

(22) PCT Filed: Mar. 23, 2012

(86) PCT No.: PCT/CN2012/072973
§ 371 (c)(1),
(2), (4) Date: Jan. 30, 2014

(87) PCT Pub. No.: WO2012/152141
PCT Pub. Date: Nov. 15, 2012

(65) Prior Publication Data
US 2014/0177582 A1    Jun. 26, 2014

(30) Foreign Application Priority Data
Aug. 8, 2011  (CN) .......................... 2011 1 0225608

(51) Int. Cl.
*H04W 4/00*    (2009.01)
*H04L 5/00*    (2006.01)
(Continued)

(52) U.S. Cl.
CPC ........... *H04L 5/0037* (2013.01); *H04L 5/0053* (2013.01); *H04W 72/00* (2013.01); *H04L 5/003* (2013.01); *H04L 5/0094* (2013.01); *H04W 74/00* (2013.01)

(58) Field of Classification Search
CPC ... H04L 5/0037; H04L 5/003; H04L 5/0094; H04L 5/0053; H04W 72/00; H04W 74/00
USPC ................................................... 370/329, 341
See application file for complete search history.

(56) References Cited

U.S. PATENT DOCUMENTS

| | | | |
|---|---|---|---|
| 2011/0076962 A1* | 3/2011 | Chen et al. | ..................... 455/68 |
| 2011/0205978 A1* | 8/2011 | Nory et al. | ................... 370/329 |

(Continued)

FOREIGN PATENT DOCUMENTS

| | | |
|---|---|---|
| CN | 102123432 A | 7/2011 |
| CN | 102291736 A | 12/2011 |

(Continued)

OTHER PUBLICATIONS

International Search Report (Form PCT/ISA/210) for PCT/CN2012/072973 dated Jul. 12, 2012.

*Primary Examiner* — Phuc Tran
(74) *Attorney, Agent, or Firm* — Koppel, Patrick, Heybl & Philpott (57) ABSTRACT

The present invention provides a method for detecting a downlink control channel, a user equipment and a base station. The detection method comprises: a UE detecting a downlink control channel of the UE in a first search space and a second search space, the first search space and the second search space being resources for a base station to send downlink control channel information. In the present invention, the downlink control channel information is sent in two search spaces, thereby developing a new PDCCH resource, solving the problem of insufficient physical downlink control channel PDCCH resources due to the increased requirements for user access, and achieving the effect of increasing the system capacity and reducing the interference.

17 Claims, 3 Drawing Sheets

(51) Int. Cl.
*H04W 72/00* (2009.01)
*H04W 74/00* (2009.01)

(56) References Cited

U.S. PATENT DOCUMENTS

2011/0243059 A1* 10/2011 Liu et al. .................... 370/315

2012/0188961 A1* 7/2012 Suzuki et al. ................ 370/329
2013/0058294 A1* 3/2013 Miki et al. .................... 370/329

FOREIGN PATENT DOCUMENTS

| WO | WO 2010/098289 A1 | 9/2010 |
| WO | WO 2010/127300 A2 | 11/2010 |

* cited by examiner

METHOD FOR DETECTING DOWNLINK CONTROL CHANNEL, USER EQUIPMENT, AND BASE STATION

TECHNICAL FIELD

The present invention relates to the field of communications, and in particular to a method for detecting a downlink control channel, a user equipment and a base station.

BACKGROUND

Figure 1:
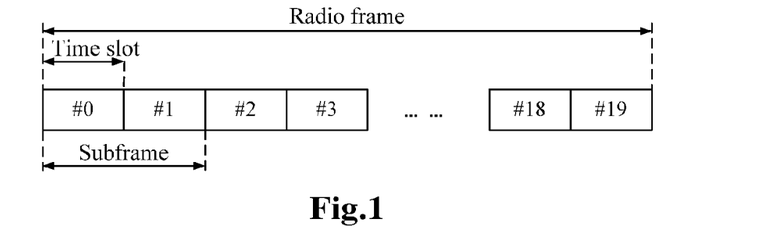
FIG. 1 shows a frame structure in an FDD mode according to relevant art.
Figure 2:
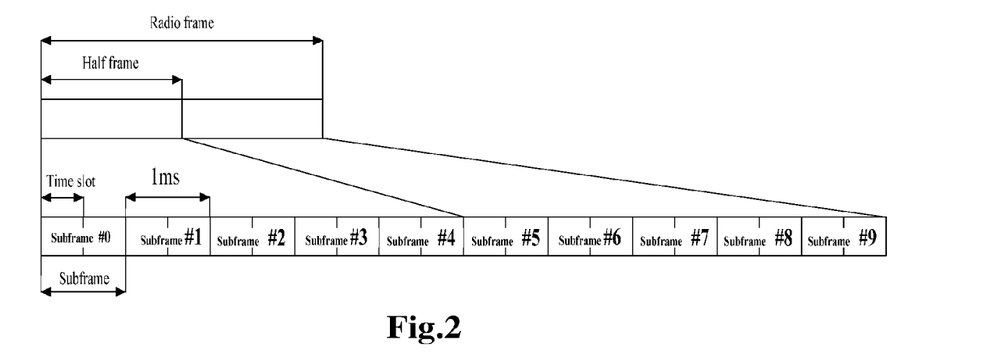
FIG. 2 shows a frame structure in a TDD mode according to relevant art.

The radio frame in a Long Term Evolution (LTE) system includes Frequency Division Duplex (FDD) mode and Division Duplex (TDD) mode. As shown in FIG. 1, in the frame structure in the FDD mode, one radio frame of 10 ms is composed of 20 time slots, wherein the length of each time slot is 0.5 ms and the 20 time slots are numbered from 0 to 19; the time slots 2i and 2i+1 compose a subframe i, the length of which is 1 ms. As shown in FIG. 2, in the frame structure in the TDD mode, one radio frame of 10 ms is composed of two half frames, wherein the length of each half frame is 5 ms; one half frame includes 5 subframes, wherein the length of each subframe is 1 ms; the subframe i is defined as two time slots 2i and 2i+1, wherein the length of each time slot is 0.5 ms. In the above-mentioned two frame structures, for a Normal Cyclic Prefix (Normal CP), one time slot includes 7 symbols, wherein the length of each symbol is 66.7 us, and a CP length of the first symbol is 5.21 us, and lengths of the rest 6 symbols are 4.69 us; for an Extended Cyclic Prefix (Extended CP), one time slot includes 6 symbols, wherein the CP lengths of all the symbols are 16.67 us.

The release number of the LTE corresponds to R8 (Release 8), the release number corresponding to the addition release thereof is R9 (Release 9), as regards a latter LTE-Advance, its release number is R10 (Release 10). Three types of downlink physical control channels are defined in the LTE as follows: a Physical Control Format Indicator Channel (PCFICH), a Physical Hybrid Automatic Retransmission Request Indicator Channel (PHICH), and a Physical Downlink Control Channel (PDCCH).

The information carried by the PCFICH is used for indicating the number of Orthogonal Frequency Division Multiplexing (OFDM) symbols transmitting the PDCCH in a subframe, and is sent in a first OFDM symbol of the subframe, and the frequency location thereof is determined by a system downlink bandwidth and a cell identity (ID).

The PHICH is used for bearing the feedback information about positive acknowledgement/negative acknowledgement (ACK/NACK) of uplink transmission data. The number of the PHICH and the time-frequency location thereof can be determined by a system message and a cell ID in a Physical Broadcast Channel (PBCH) of a downlink carrier at which the PHICH locates.

The PDCCH is used for bearing Downlink Control Information (DCI), the DCI includes uplink and downlink scheduling information and uplink power control information. DCI formats are divided into the following types: DCI format 0, DCI format 1, DCI format 1A, DCI format 1B, DCI format 1C, DCI format 1D, DCI format 2, DCI format 2A, DCI format 3, DCI format 3A, etc., wherein:

the DCI format 0 is used for indicating the scheduling of a Physical Uplink Shared Channel (PUSCH);

the DCI format 1, the DCI format 1A, the DCI format 1B, the DCI format 1C and the DCI format 1D are used for PDSCH codeword scheduling in different modes;

and the DCI format 2, the DCI format 2A and the DCI format 2B are used for space division multiplexing in different modes;

and the DCI format 3 and the DCI format 3A are used for power control instructions of a Physical Uplink Control Channel (PUCCH) and the PUSCH in different modes.

The physical transmission resource of the physical downlink control channel (PDCCH) takes Control Channel Element (CCE) as unit, the size of one CCE is 9 Resource Element Groups (REG), i.e. 36 Resource Elements, and one PDCCH may occupy 1, 2, 4 or 8 CCE(s). As regards the sizes of these four-type PDCCHs occupied 1, 2, 4 and 8 CCE(s), an arborescence aggregation is used, that is to say, the PDCCH occupied by 1 CCE can start from any CCE location; the PDCCH occupied by 2 CCEs starts from an even number of CCE location; the PDCCH occupied by 4 CCEs starts from CCE location of an integer multiplied by 4; and the PDCCH occupied by 8 CCEs starts from CCE location of an integer multiplied by 8.

Each Aggregation level defines a search space, which includes a common search space and a User Equipment Specific (UE-Specific) search space. The number of CCEs of the whole search space is determined by the number of OFDM symbolic number and the number of the PHICH group which are occupied by a control domain instructed by the PCFICH in each downlink subframe. The UE performs blind detection on all the possible PDCCH code rates in the search space according to a DCI format in which the transmission mode is.

In the kth subframe, a control domain bearing the PDCCH consists of $N_{CCE,k}$ CCEs of which a group numbers are from 0 to $N_{CCE,k}-1$. The UE should detect a group of PDCCH candidates in each non-DRX (non-Discontinuous Reception) subframe so as to acquire control information, and the detection means decoding the PDCCHs in the group according to all the DCI formats to be detected. The PDCCH candidates required to be detected are defined in a manner of search space, as regards aggregation level $L \in \{1, 2, 4, 8\}$, the search spaced is defined by a group of PDCCH candidates. In the search space $S_j^{(L)}$ the CCE corresponding to the PDCCH candidate m is defined by the following formula:

$$L \cdot \{(Y_k+m) \bmod \lfloor N_{CCE,k}/L \rfloor\}+i$$

where i=0, ..., L−1, m=0, ..., $M^{(L)}-1$, $M^{(L)}$ is the number of PDCCH candidates to be detected in the search space. $S_k^{(L)}$ As regards the common search space, where $Y_k=0$, L takes 4 and 8. As regards the UE-specific search space, L takes 1, 2, 4 and 8.

$$Y_k=(AY_{k-1}) \bmod D,$$

where $Y_{-1}=n_{RNTI} \neq 0$, A=39827, D=65537, k=$\lfloor n_s/2 \rfloor$, $n_s$ is a time slot number in a radio frame. $n_{RNTI}$ is a corresponding RNTI (Radio Network Temporary Identifier).

The UE should detect one common search space in each of which the aggregation levels are 4 and 8 respectively, and one UE-specific search space in each of which the aggregation levels are 1, 2, 4 and 8 respectively, and a common search space and a UE-specific search space can overlap. Particular the number of times of detection and a corresponding search space are shown in Table 1:

TABLE 1

| Search space $S_k^{(L)}$ | | Number of PDCCH candidates $M^{(L)}$ |
|---|---|---|
| Type | Aggregation level L | Size [in CCEs] | |

| Type | Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE is set as a transmission mode based on the followings through high-layer signalling semi-statically, receiving PDSCH data transmission according to the instruction of the PDCCH of the UE-Specific search space:

Mode 1: Single-antenna port; and port 0
Mode 2: Transmit diversity
Mode 3: Open-loop spatial multiplexing
Mode 4: Closed-loop spatial multiplexing
Mode 5: Multi-user multiple input multiple output (Multi-user MIMO)
Mode 6: Closed-loop Rank=1 precoding
Mode 7: Single-antenna port; and port 5

If the UE is set by a high-layer to use a Cyclical Redundancy Check (CRC) which is scrambled by a Cell Radio Network Temporary Identifier (C-RNTI) to decode the PDCCH, the UE should decode the PDCCH and all the relevant PDSCHs according to corresponding combination defined in table 2:

TABLE 2

| UE downlink transmission mode | DCI format | Search space | PDCCH corresponding to PDSCH transmission plan |
|---|---|---|---|
| Mode 1 | DCI format 1A | Common search space, UE specific search space defined by C-RNTI | A single-antenna port, port 0 |
| | DCI format 1 | UE specific search space defined by C-RNTI | A single-antenna port, port 0 |
| Mode 2 | DCI format 1A | Common search space, UE specific search space defined by C-RNTI | Transmission diversity |
| | DCI format 1 | UE specific search space defined by C-RNTI | Transmission diversity |
| Mode 3 | DCI format 1A | Common search space, UE specific defined by C-RNTI | Transmission diversity |
| | DCI format 2A | UE specific search space defined by C-RNTI | Open-loop spatial multiplexing or transmission diversity |
| Mode 4 | DCI format 1A | Common search space, UE specific search space defined by C-RNTI | Transmission diversity |
| | DCI format 2 | UE specific search space defined by C-RNTI | Closed-loop spatial multiplexing or transmission diversity |
| Mode 5 | DCI format 1A | Common search space, UE specific search space defined by C-RNTI | Transmission diversity |
| | DCI format 1D | UE specific search space defined by C-RNTI | Multi-user multiple input multiple output |
| Mode 6 | DCI format 1A | Common search space, UE specific search space defined by C-RNTI | Transmission diversity |
| | DCI format 1B | UE specific search space defined by C-RNTI | Closed-loop Rank = 1 precoding |
| Mode 7 | DCI format 1A | Common search space, UE specific search space defined by C-RNTI | If the number of PBCH antenna ports is 1, a single-antenna port, port 0, is used; otherwise, transmission diversity |
| | DCI format 1 | UE specific search space defined by C-RNTI | a single-antenna port; port 5 |
| Mode 8 | DCI format 1A | Common search space, UE specific search space defined by C-RNTI | If the number of PBCH antenna ports is 1, a single-antenna port, port 0, is used; otherwise, transmission diversity |
| | DCI format 2B | UE specific search space defined by C-RNTI | Dual-layer transmission, port 7 and port 8; or a single-antenna port, port 7 or 8 |
| Mode 9 | DCI format 1A | Common search space, UE specific search space defined by C-RNTI | If the number of PBCH antenna ports is 1, a single-antenna port, port 0, is used; otherwise, transmission diversity |
| | DCI format 2C | UE specific search space defined by C-RNTI | up to 8-layer transmission, port 7-port 14 |

Since an LTE-Advanced network is accessible for the LTE user, an operation frequency band thereof requires to cover the current LTE frequency band, the operation frequency has no spectral bandwidth of continuous 100 MHz which is able to be distributed at this frequency band, therefore, a direct technology required to be solved by the LTE-Advanced is using the carrier aggregation technology to aggregate several continuous component carrier frequencies (frequency spectrum) distributed at different frequency bands so as to form 100 MHz bandwidth which is able to be used by the LTE-Advanced. That is to say, as regards the aggregated frequency spectrum, it is divided into n component carrier frequencies (frequency spectrum), the frequency spectrum in each component carrier frequency (frequency spectrum) is continuous.

In the Release 11, a future release of the LTE-Advanced, since the requirements for user access increase, the original physical downlink control channel (PDCCH) resources will be insufficient to satisfy the requirements for a new release. Meanwhile, in a scenario of heterogeneous networks, since there is strong interference between different types of base stations, the problem of a macro eNodeB interfering with a micro eNodeB (Pico) and the problem of a home eNodeB interfering with a macro eNodeB require to be well solved.

SUMMARY

The present invention provides a method for detecting downlink control channel information, a user equipment, and a base station, and at least solving the above-mentioned problem of insufficient physical downlink control channel (PDCCH) resources due to the increased requirements for user access.

According to one aspect of the present invention, a method for detecting a downlink control channel is provided, the method includes: the user equipment (UE) detects the downlink control channel of the UE in a first search space and a second search space, wherein the first search space and the second search space are resources for a base station to send downlink control channel information.

Preferably, the first search space is distributed at a subframe or a time slot or a time-frequency location; and the second search space is distributed at another subframe or another time slot or another time-frequency location, wherein the time-frequency at which the first search space are located and the time-frequency at which the second search space are located can overlap.

Preferably, both the first search space and the second search space are UE-specific search spaces.

Preferably, the UE detects an uplink grant (UL grant) of the downlink control channel in the first search space, and the UE detects a downlink grant (DL grant) of the downlink control channel in the second search space; or the UE detects the uplink grant and the downlink grant in both the first search space and the second search space.

Preferably, the downlink control information format configured in the first search space is not the same as the downlink control information format configured in the second search space.

Preferably, the UE detects in the first search space and the second search space that the downlink control channel of the UE includes: the UE detects the DL grant and the UL grant which is carried by the downlink control information format (DCI format) 0 in the first search space and detects all the UL grants except for the UL grant carried by the DCI format 0 in the second search space.

Preferably, the UE detects in the first search space and the second search space that the downlink control channel of the UE includes: the UE detects the UL grant and the DL grant which is carried by the DCI format 1A in the second search space and detects all the DL grants except for the DL grant carried by the DCI format 1A in the first search space.

Preferably, the UE detects in the first search space and the second search space that the downlink control channel of the UE includes: the UE detects the DCI format 1A and the DCI format 0 in the common search space, detects other DL Grants except for the DCI format 1A in the first search space, and detects other UL Grants except for the DCI format 0 in the second search space, wherein the common search space is a search space required to be detected by all the UEs.

Preferably, before the UE detects the downlink control channel of the UE in the first search space and the second search space, it further includes: the base station sends downlink control channel information to the UE in the first search space and/or the second search space.

Preferably, before the base station sends downlink control channel information to the UE in the first search space and/or the second search space, it further includes: the base station merges downlink control information formats which are used for carrying the downlink control channel information.

Preferably, the UE detects in the first search space and/or the second search space that the downlink control channel includes: the UE using the configuration of {a, b, c, d} as the number of PDCCH candidate to detect the PDCCH, wherein a+b+c+d is less than or equals 8.

Preferably, the UE uses the configuration of {3, 3, 1, 1} as the number of PDCCH candidate to detect the PDCCH.

Preferably, the UE detects in the first search space and/or the second search space that the downlink control channel includes: the UE uses the configuration of {a, b, c, d} as the number of PDCCH candidate to detect the PDCCH in the first search space or the second search space, and uses the configuration of {6, 6, 2, 2} as the number of PDCCH candidate to detect the PDCCH in another search space; or when detecting the DCI format 1A and the DCI format 0, the UE uses the configuration of {a, b, c, d} as the number of PDCCH candidate to detect the PDCCH, and when detecting other DCI formats except for the DCI format 1A and the DCI format 0, it uses the configuration of {6, 6, 2, 2} as the number of PDCCH candidate to detect the PDCCH; or when detecting the DCI formats except for the DCI formats 0 and 1A, the UE uses the configuration of {a, b, c, d} as the number of PDCCH candidate to detect the PDCCH, and when detecting the DCI format 1A and the DCI format 0, it uses the configuration of {6, 6, 2, 2} as the number of PDCCH candidate to detect the PDCCH.

Preferably, the UE detects in the first search space and/or the second search space that the downlink control channel includes: the UE using aggregation level {e, f} to detect the PDCCH, wherein e and f are both positive integers.

Preferably, the UE detects in the first search space and/or the second search space that the downlink control channel includes: the UE uses the aggregation level configuration of {e, f} to detect the PDCCH in the first search space or the second search space, and uses the aggregation level configuration of {1, 2, 4, 8} to detect the PDCCH in another search space; or when detecting the DCI format 1A and the DCI format 0, the UE uses the aggregation level configuration of {e, f} to detect the PDCCH, when detecting other DCI formats except for the DCI format 1A and the DCI format 0, it uses the aggregation level configuration of {1, 2, 4, 8} to detect the PDCCH; or when detecting the DCI formats except for the DCI formats 0 and 1A, the UE uses the aggregation level configuration of {e, f} to detect the PDCCH, and when detecting the DCI format 1A and the DCI format 0, it uses the aggregation level configuration of {1, 2, 4, 8} to detect the PDCCH.

According to another aspect of the present invention, a user equipment (UE) is provided, the UE includes: a detection module, which is configured to detect a downlink control channel of the UE in a first search space and a second search space, wherein the first search space and the second search space are resources for a base station to send downlink control channel information.

Preferably, the detection module includes: a first detection module, which is configured to use the configuration of {a, b, c, d} as the number of PDCCH candidate to detect the PDCCH, wherein a+b+c+d is less than or equals 8.

Preferably, the detection module includes: a second detection module, which is configured to use the aggregation level configuration of {e, f} to detect the PDCCH, wherein e and f respectively belong to any value of set {1, 2, 4, 8}.

According to yet another aspect of the present invention, a base station is provided, the base station includes: a sending module, which is configured to send a downlink control channel information to the UE in a first search space and a second search space, wherein the first search space and the second search space are resources for a base station to send downlink control channel information.

Preferably, the sending module includes: a first sending sub-module is configured to send a DL grant and a UL grant which is carried by the downlink control information format (DCI format) 0 in the first search space and send all the UL grants except for the UL grant carried by the DCI format 0 in the second search space.

Preferably, the sending module includes: a second sending sub-module is configured to send a UL grant and a DL grant which is carried by the DCI format 1A in the second search space and send all the DL grants except for the DL grant carried by the DCI format 1A in the first search space.

Preferably, the base station further includes: a merge module configured to merge downlink control information formats which are used for carrying downlink control channel information.

In the present invention, the downlink control channel information is sent in two search spaces, thereby developing a new PDCCH resource, solving the problem of insufficient physical downlink control channel (PDCCH) resources due to the increased requirements for user access, and achieving the effect of increasing the system capacity and reducing the interference.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE PREFERRED EMBODIMENTS

The disclosure is described below with reference to the accompanying drawings and embodiments in detail. Note that, the embodiments of the disclosure and the features of the embodiments can be combined with each other if there is no conflict.

Embodiment 1

Figure 3:
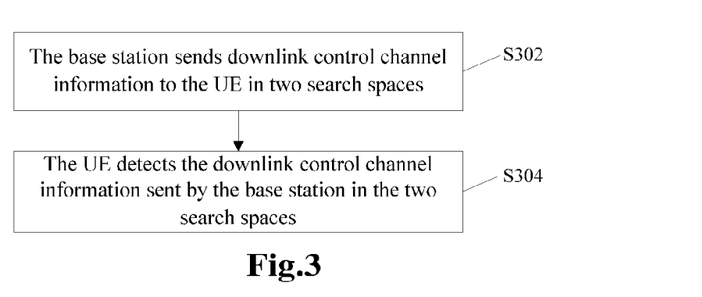
FIG. 3 shows a flowchart of sending and detecting downlink control channel information according to embodiment 1 of the present invention.

FIG. 3 shows a flowchart of sending and detecting the downlink control channel information according to embodiment 1 of the present invention, as shown in FIG. 3, it includes the steps as follows:

Step S302, the base station sends the downlink control channel information to the UE in two search spaces.

Step S304, the UE detects the downlink control channel information sent by the base station in the two search spaces.

In this embodiment, by virtue of the base station sends the downlink control channel information to the UE in two search spaces, a new PDCCH resource has been introduced, thereby solving the problem of insufficient physical downlink control channel (PDCCH) resources due to the increased requirements for user access, and achieving the effect of increasing the system capacity and reducing the interference.

Two search spaces correspond to two subframes or two time slots or two different time-frequency domain locations, wherein the time-frequency domain locations of two search spaces can overlap.

Two search spaces are UE-specific search spaces, which respectively correspond to the uplink grant (UL grant) and the downlink grant (DL grant) of the downlink control channel information; or the uplink grant and the downlink grant can be sent in both the two UE-specific search spaces.

One or more manners as follows can be used to send and detect the downlink control channel information: the base station ensures that the number of times of detection does not increase through the manner of configuring different downlink control information formats in different search spaces. The base station ensures that the number of times of detection does not increase through the manner of reducing the number of PDCCH candidate. The base station ensures that the number of times of detection does not increase through the manner of reducing the aggregation level. The base station ensures that the number of times of detection does not increase through the manner of merging the downlink control information formats. It is specifically as follows:

Manner 1, the DL grant and the UL grant which is carried by the downlink control information format (DCI format) 0 are sent and received in the first UE-specific search space, while all the UL grants except for the UL grant carried by the DCI format 0 are sent and received in the second UE-specific search space.

Or, the UL grant and the DL grant carried by the DCI format 1A are sent and received in the second UE-specific search space, while all the DL grants except for the DL grant carried by the DCI format 1A are sent and received in the first UE-specific search space.

Or, the UE detects the DCI format 1A and the DCI format 0 in the common search space, detects other DL Grants except for the DCI format 1A in the first search space, and detects other UL Grants except for the DCI format 0 in the second search space, wherein the common search space is a search space required to be detected by all the UEs.

Manner 2, in one of UE-specific search spaces, or when the DCI format 1A and DCI format 0 are detected, or when the DCI formats except for the DCI formats 0 and 1A are detected, the number of PDCCH candidate {a, b, c, d} is used to detect the PDCCH; and the values of a, b, c and d satisfy: a+b+c+d is less than or equals 8, and the preferred values are {3, 3, 1, 1}.

Manner 3, the UL grant which is carried by the DCI format 0 and the DL grant are sent and received in the first UE-specific search space; and all the UL grants except for the UL grant carried by the DCI format 0 are sent and received in the second UE-specific search space; moreover, as regards all the UL grants except for the UL grant carried by the DCI format 0, they are all performed the PDCCH detection according to the number configuration of PDCCH candidate {a, b, c, d} in the first and the second UE-specific search spaces, and other DCI formats are performed the PDCCH detection according to the number configuration of PDCCH candidate {6, 6, 2, 2}.

The UL grant and the DL grant which is carried by the DCI format 1A are sent and received in the second UE-specific search space, and the first UE-specific search space corresponds to all the DL grants except for the DL grant carried by the DCI format 1A. Moreover, as regards all the DL grants except for the DL grant carried by the DCI format 1A, they are all performed the PDCCH detection according to the number configuration of PDCCH candidate {a, b, c, d} in the first and the second UE-specific search spaces, and other DCI formats are performed the PDCCH detection according to the number configuration of PDCCH candidate {6, 6, 2, 2}.

The first and the second UE-specific search spaces can be used interchangeably. The values of a, b, c and d satisfy: a+b+c+d is less than or equals 8, and the preferred values are {3, 3, 1, 1}.

Manner 4, in one UE-specific search space therein, or when the DCI format 1A and DCI format 0 are detected, or when the DCI formats except for the DCI formats 0 and 1A are detected, the UE uses the configuration of aggregation level {e, f} to detect the PDCCH, wherein the values of {e, f} is/are one or more of {1, 4}, {1, 8}, {2, 4}, {2, 8} and {4, 8}.

Manner 5, the UL grant and the DL grant which is carried by the DCI format 0 are sent and received in the first UE-specific search space, and all the UL grants except for the UL grant carried by the DCI format 0 are sent and received in the second UE-specific search space; moreover, as regards all the UL grants except for the UL grant carried by the DCI format 0, they are all performed the PDCCH detection according to the configuration of aggregation level {e, f} in the first and the second UE-specific search spaces, and other DCI formats are performed the PDCCH detection according to the configuration of aggregation level {1, 2, 4, 8}; and the UL grant and the DL grant which is carried by the DCI format 1A are sent and received in the second UE-specific search space, and the first UE-specific search space corresponds to all the DL grants except for the DL grant carried by the DCI format 1A. Moreover, as regards all the DL grants except for the DL grant carried by the DCI format 1A, they are all performed the PDCCH detection according to the configuration of aggregation level {e, f} in the first and the second UE-specific search spaces, wherein the values of {e, f} is/are one or more of {1, 4}, {1, 8}, {2, 4}, {2, 8} and {4, 8}, and other DCI formats are performed the PDCCH detection according to the configuration of aggregation level {1, 2, 4, 8}. The first and the second UE-specific search spaces can be used interchangeably.

Manner 6, DCI formats carrying the UL grant are performed a merge operation, for example, merging the DCI format 0 and the DCI format 4. Specifically, a DCI format with a small load is added a corresponding 0 bit thereto so as to make the size of its load is identical with that of a DCI format with a large load. Moreover, n bits are used to differentiate the DCI formats before being merged.

Or, DCI formats carrying the DL grant are performed a merge operation, for example, merging the DCI format 1A and the DCI format 2C. Specifically, a DCI format with a small load is added a corresponding 0 bit thereto so as to make the size of its load is identical with that of a DCI format with a large load. Moreover, n bits are used to differentiate the DCI formats before being merged;

or DCI formats carrying UL grant and DL grant are performed a merge operation at the same time.

Embodiment 2

Figure 4:
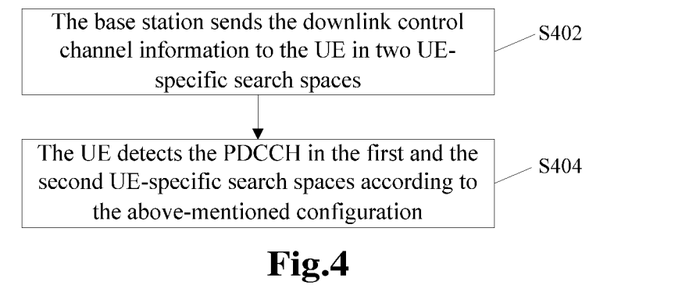
FIG. 4 shows a flowchart of sending and detecting the downlink control channel information according to embodiment 2 of the present invention.

In this embodiment, the base station ensures that the number of times of detection does not increase when compared with the prior art through the method of configuring different downlink control information formats in different search spaces. As shown in FIG. 4, the following steps are included:

step S402, the base station sends the downlink control channel information to the UE in two UE-specific search spaces, comprising an uplink grant and a downlink grant. The two UE-specific search spaces are distributed at two subframes or two time slots or two different time-frequency locations, wherein the time-frequency locations of two search spaces can overlap.

The first UE-specific search space corresponds to the DL grant and the UL grant which is carried by the downlink control information format (DCI format) 0, and the second UE-specific search space corresponds to all the UL grants except for the UL grant carried by the DCI format 0.

Or the second UE-specific search space corresponds to the UL grant and the DL grant which is carried by the DCI format 1A, and the first UE-specific search space corresponds to all the DL grants except for the DL grant carried by the DCI format 1A.

Or, the UE detects the DCI format 1A and the DCI format 0 in the common search space, detects other DL Grants except for the DCI format 1A in the first search space, and detects other UL Grants except for the DCI format 0 in the second search space, wherein the common search space is a search space required to be detected by all the UEs.

Step S404, the UE detects the PDCCH in the first and the second UE-specific search spaces according to the above-mentioned configuration.

In this embodiment, the first and the second UE-specific search spaces can be used interchangeably. According to the above-mentioned configuration, the UE monitors the total number of times of the PDCCH required to be detected in the first and the second UE-specific search spaces, and it does not increase being compared with R10 version of the LTE-Advance.

Embodiment 3

In this embodiment, the base station ensures that the number of times of detection does not increase when compared with the prior art through the method of reducing the number of PDCCH candidates.

The station sends the downlink control channel information to the UE in two UE-specific search spaces, comprising an uplink grant and a downlink grant.

The two UE-specific search spaces are distributed at two subframes or two time slots or two different time-frequency locations, wherein the time-frequency locations of two search spaces can overlap. The UE detects the DCI format carrying the UL grant in the first UE-specific search space, and detects the DCI format carrying the DL grant in the second UE-specific search space; or the UE detects the DCI format carrying the UL grant in the second UE-specific search space and detects the DCI format carrying the DL grant in the first UE-specific search space; or it detects the DCI format carrying the UL grant and the DCI format carrying the DL grant in both the first and the second UE-specific search spaces.

In a UE-specific search space, the UE will not detect the PDCCH according to the number configuration of PDCCH candidates {6, 6, 2, 2} any more, but uses the configuration of {a, b, c, d}. In another UE-specific search space, the UE detects the PDCCH according to the number configuration of PDCCH candidate {6, 6, 2, 2};

or in a UE-specific search space, when the DCI format 1A is detected, the PDCCH detection is performed according to the number configuration of PDCCH candidate {a, b, c, d}; meanwhile, in another UE-specific search space, when the DCI format 0 is detected, the PDCCH detection is performed according to the number configuration of PDCCH candidate {a, b, c, d}, and the remaining DCI formats are performed the PDCCH detection according to the number configuration of PDCCH candidate {6, 6, 2, 2};

or in a UE-specific search space, when the DCI format 1A and the DCI format 0 are detected, the PDCCH detection is performed according to the number configuration of PDCCH candidate {a, b, c, d}, and in another UE-specific search space, when the DCI format 1A and the DCI format 0 are detected, the PDCCH detection is performed according to the number configuration of PDCCH candidate {a, b, c, d}, and the remaining DCI formats are performed the PDCCH detection according to the number configuration of PDCCH candidate {6, 6, 2, 2};

or in a UE-specific search space, when all the DCI formats except for the DCI format 1A are detected, the PDCCH detection is performed according to the number configuration of PDCCH candidate {a, b, c, d}; meanwhile, in another UE-specific search space, when all the DCI formats except for the DCI format 0 are detected, the PDCCH detection is performed according to the number configuration of PDCCH candidate {a, b, c, d}, and the remaining DCI formats are performed the PDCCH detection according to the number configuration of PDCCH candidate {6, 6, 2, 2}.

In this embodiment, the values of a, b, c and d satisfy: a+b+c+d is less than or equals 8, and the preferred values are {3, 3, 1, 1}. As shown in table 3

TABLE 3

| Type | Search space $S_k^{(L)}$ Aggregation level L | Size [in CCEs] | Number of PDCCH candidates $M^{(L)}$ |
|---|---|---|---|
| UE-specific | 1 | 3 | 3 |
| | 2 | 6 | 3 |
| | 4 | 4 | 1 |
| | 8 | 8 | 1 |

According to the above-mentioned configuration, the UE monitors the total number of times of the PDCCH required to be detected in the first and the second UE-specific search spaces, and it does not increase being compared with R10 version of the LTE-Advance.

Embodiment 4

In this embodiment, the base station ensures that the number of times of detection does not increase when compared with the prior art through the method of configuring different downlink control information formats in different search spaces and reducing the PDCCH candidate number at the same time. The station sends the downlink control channel information to the UE in two UE-specific search spaces, comprising an uplink grant and a downlink grant. The two UE-specific search spaces are distributed at two subframes or two time slots or two different time-frequency locations, wherein the time-frequency locations of two search spaces can overlap.

The first UE-specific search space corresponds to the DL grant and the UL grant, and the second UE-specific search space corresponds to all the UL grants except for the UL grant carried by the DCI format 0. Moreover, all the UL grants except for the UL grant which is carried by the DCI format 0 are all performed the PDCCH detection according to the number configuration of PDCCH candidate {a, b, c, d} in the first and the second UE-specific search spaces, and other DCI formats are performed the PDCCH detection according to the number configuration of PDCCH candidate {6, 6, 2, 2};

or the second UE-specific search space corresponds to the UL grant and the DL grant, and the first UE-specific search space corresponds to all the DL grants except for the DL grant carried by the DCI format 1A. Moreover, all the DL grants except for the DL grant carried by the DCI format 1A are all performed the PDCCH detection according to the number configuration of PDCCH candidate {a, b, c, d} in the first and the second UE-specific search spaces, and other DCI formats are performed the PDCCH detection according to the number configuration of PDCCH candidate {6, 6, 2, 2}.

In this embodiment, the first and the second UE-specific search spaces can be used interchangeably. The values of a, b, c and d satisfy: a+b+c+d is less than or equals 8, and the preferred values are {3, 3, 1, 1}.

According to the above-mentioned configuration, the UE monitors the total number of times of the PDCCH required to be detected in the first and the second UE-specific search spaces, and it does not increase being compared with R10 version of the LTE-Advance.

Embodiment 5

In this embodiment, the base station ensures that the number of times of detection does not increase when compared with the prior art through the method of reducing the aggregation level. The station sends the downlink control channel information to the UE in two UE-specific search spaces, comprising an uplink scheduling grant and a downlink scheduling grant.

The two UE-specific search spaces are distributed at two subframes or two time slots or two different time-frequency locations, wherein the time-frequency locations of two search spaces can overlap. For example, the UE detects the DCI format carrying the UL grant in the first UE-specific search space, and detects the DCI format carrying the DL grant in the second UE-specific search space; or the UE detects the DCI format carrying the UL grant in the second UE-specific search space and detects the DCI format carrying the DL grant in the first UE-specific search space; or it detects the DCI format carrying the UL grant and the DCI format carrying the DL grant in both the first and the second UE-specific search spaces.

In a UE-specific search space, the configuration of aggregation level {e, f} is used to detect the PDCCH. In another UE-specific search space, the UE detects the PDCCH according to the configuration of aggregation level {1, 2, 4, 8}.

Or in a UE-specific search space, when the DCI format 1A is detected, the configuration of aggregation level {e, f} is used to detect the PDCCH; meanwhile, in another UE-specific search space, when the DCI format 0 is detected, the PDCCH detection is performed according to the configuration of aggregation level {e, f}, and the remaining DCI formats are performed the PDCCH detection according to the configuration of aggregation level {1, 2, 4, 8}.

Or in a UE-specific search space, when the DCI format 1A and the DCI format 0 are detected, the configuration of aggregation level {e, f} is used to detect the PDCCH, and in another UE-specific search space, when the DCI format 1A and the DCI format 0 are detected, the PDCCH detection is performed according to the configuration of aggregation level {e, f}, and the remaining DCI formats are performed the PDCCH detection according to the number configuration of PDCCH candidate {6, 6, 2, 2}.

Or in a UE-specific search space, when all the DCI formats except for the DCI format 1A are detected, the configuration of aggregation level {e, f} is used to detect the PDCCH; meanwhile, in another UE-specific search space, when all the DCI formats except for the DCI format 0 are detected, the PDCCH detection is performed according to the configuration of aggregation level {e, f}, and the remaining DCI formats are performed the PDCCH detection according to the configuration of aggregation level {1, 2, 4, 8}. The values of {e, f} is/are one or more of {1, 4}, {1, 8}, {2, 4}, {2, 8} and {4, 8}.

As shown in table 4, according to the above-mentioned configuration, the UE monitors the total number of times of the PDCCH required to be detected in the first and the second UE-specific search spaces, and it does not increase being compared with R10 version of the LTE-Advance.

TABLE 4

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 4 | 8 | 2 |

Embodiment 6

In this embodiment, the base station ensures that the number of times of detection does not increase when compared with the prior art through the method of configuring different downlink control information formats in different search spaces and reducing the aggregation level at the same time.

The station sends the downlink control channel information to the UE in two UE-specific search spaces, the downlink control channel information includes an uplink grant and a downlink grant. The two UE-specific search spaces are distributed at two subframes or two time slots or two different time-frequency locations, wherein the time-frequency locations of two search spaces can overlap.

The first UE-specific search space corresponds to the DL grant and the UL grant, and the second UE-specific search space corresponds to all the UL grants except for the UL grant carried by the DCI format 0. Moreover, all the UL grants except for the UL grant carried by the DCI format 0 are all performed the PDCCH detection according to the configuration of aggregation level {e, f} in the first and the second UE-specific search spaces, and other DCI formats are performed the PDCCH detection according to the configuration of aggregation level {1, 2, 4, 8};

or the second UE-specific search space corresponds to the UL grant and the DL grant, and the first UE-specific search space corresponds to all the DL grants except for the DL grant carried by the DCI format 1A. Moreover, all the DL grants except for the DL grant carried by the DCI format 1A are all performed the PDCCH detection according to the configuration of aggregation level {e, f} in the first and the second UE-specific search spaces, and other DCI formats are performed the PDCCH detection according to the configuration of aggregation level {1, 2, 4, 8}.

In this embodiment, the first and the second UE-specific search spaces can be used interchangeably. The values of {e, f} is/are one or more of {1, 4}, {1, 8}, {0, 4}, {2, 8} and {4, 8}.

According to the above-mentioned configuration, the UE monitors the total number of times of the PDCCH required to be detected in the first and the second UE-specific search spaces, and it does not increase being compared with R10 version of the LTE-Advance.

Embodiment 7

In this embodiment, the base station ensures that the number of times of detection does not increase through the method of merging the downlink control information formats.

The station sends the downlink control channel information to the UE in two UE-specific search spaces, comprising an uplink scheduling grant and a downlink scheduling grant.

The two UE-specific search spaces are distributed at two subframes or two time slots or two different time-frequency locations, wherein the time-frequency locations of two search spaces can overlap. For example, the UE detects the DCI format carrying the UL grant in the first UE-specific search space, and detects the DCI format carrying the DL grant in the second UE-specific search space; or the UE detects the DCI format carrying the UL grant in the second UE-specific search space and detects the DCI format carrying the DL grant in the first UE-specific search space; or it detects the DCI format carrying the UL grant and the DCI format carrying the DL grant in both the first and the second UE-specific search spaces.

DCI formats which carry the UL grant are performed a merge operation, for example, merging the DCI format 0 and the DCI format 4. Specifically, a DCI format with a small load is added a corresponding 0 bit thereto so as to make the size of its load is identical with that of a DCI format with a large load. Moreover, n bits are used to differentiate the DCI formats before being merged;

or, DCI formats carrying the DL grant are performed a merge operation, for example, merging the DCI format 1A and the DCI format 2C. Specifically, a DCI format with a small load is added a corresponding 0 bit thereto so as to make the size of its load is identical with that of a DCI format with a large load. Moreover, n bits are used to differentiate the DCI formats before being merged;

or DCI formats carrying UL grant and DL grant are performed a merge operation at the same time.

According to the above-mentioned configuration, the UE monitors the total number of times of the PDCCH required to be detected in the first and the second UE-specific search spaces, and it does not increase being compared with R10 version of the LTE-Advance.

Figure 5:
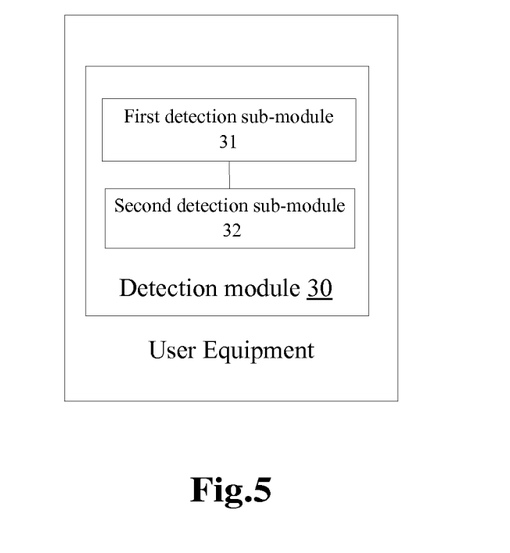
FIG. 5 shows a structural block diagram of a UE module according to the embodiment of the present invention.
Figure 6:
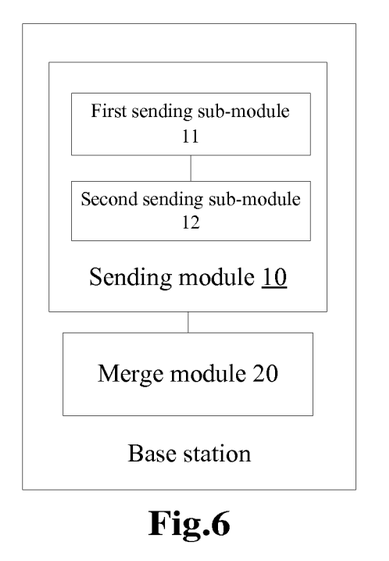
FIG. 6 shows a structural block diagram of a base station module according to the embodiment of the present invention.

FIG. 5 shows a structural block diagram of a UE module according to the embodiment of the present invention. As shown in FIG. 6, the UE includes: a detection module 30, which is configured to detect the downlink control channel information sent by the base station in the first search space and the second search space.

The detection module 30 can further includes: a first detection module 31 configured to use the configuration of {a, b, c, d} as the number of PDCCH candidates to detect the PDCCH, wherein a+b+c+d is less than or equals 8. A second detection module 32 is set to use the configuration of {e, f} as aggregation level to detect the PDCCH, wherein the values of {e, f} is/are one or more of {1, 4}, {1, 8}, {2, 4}, {2, 8} and {4, 8}.

FIG. 6 shows a structural block diagram of a base station module according to the embodiment of the present invention. As shown in FIG. 5, the base station includes a sending module 10, and the sending module 10 is set to send the downlink control channel information to the UE in the first search space and the second search space.

The sending module 10 can further comprise: a first sending sub-module 11 and a second sending sub-module 12. The first sending sub-module 11 is set to send the DL grant and the UL grant which is carried by the downlink control information format (DCI format) 0 in the first search space and send all the UL grants except for the UL grant carried by the DCI format 0 in the second search space. The second sending sub-module 12 is set to send UL grant and DL grant which is carried by the DCI format 1A in the second search space and send all the DL grants except for the DL grant carried by the DCI format 1A in the first search space.

The base station can further comprise: a merge module 20 which is configured to merge downlink control information formats which are used for carrying the downlink control channel information.

In each above-mentioned embodiment of the present invention, the base station sends the downlink control channel information to the UE in two search spaces, developing a new PDCCH resource, thereby solving the problem of insufficient physical downlink control channel (PDCCH) resources due to the increased requirements for user access, and achieving the effect of increasing the system capacity and reducing the interference.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for detecting a Physical Downlink Control Channel (PDCCH), comprising:
   a User Equipment (UE) detecting a downlink control channel of the UE in a first search space and a second search space, wherein the first search space and the second search space are resources for a base station to send downlink control channel information;
   wherein both of the first search space and the second search space are UE-specific search spaces, and the first search space is distributed at a subframe or a time slot or a time-frequency location; and the second search space is distributed at another subframe or another time slot or another time-frequency location, wherein a time frequency at which the first search space is located and a time frequency at which the second search space is located can overlap;
   wherein the step of the UE detects the downlink control channel in the first search space and/or the second search space comprises:
   the UE using a configuration of {a, b, c, d} as the number of PDCCH candidates to detect PDCCH, wherein a, b, c and d are all positive integers and a+b+c+d is less than or equals 8; or
   the UE using a configuration of {e, f} as aggregation level to detect the PDCCH, where e and f are both positive integers, and the values of e and f belong to a set {1, 2, 4, 8}.

2. The method according to claim 1, wherein the UE detects an uplink grant (UL grant) of the downlink control channel in the first search space, and the UE detects a downlink grant (DL grant) of the downlink control channel in the second search space; or the UE detects the uplink grant and the downlink grant in both the first search space and the second search space.

3. The method according to claim 1, wherein a downlink control information format configured in the first search space is not the same as a downlink control information format configured in the second search space.

4. The method according to claim 3, wherein the step of the UE detects the downlink control channel of the UE in the first search space and the second search space comprises:
   the UE detecting the DL grant and the UL grant which is carried by downlink control information format (DCI format) 0 in the first search space and detecting all the UL grants except for the UL grant carried by the DCI format 0 in the second search space; or
   the UE detecting the UL grant and the DL grant which is carried by the DCI format 1A in the second search space and detecting all the DL grants except for the DL grant carried by the DCI format 1A in the first search space; or
   the UE detecting the DCI format 1A and DCI format 0 in a common search space, detecting other DL Grants except for the DCI format 1A in the first search space, and detecting other UL Grants except for the DCI format 0 in the second search space, wherein the common search space is a search space required to be detected by all the UEs.

5. The method according to claim 1, wherein before the UE detects the downlink control channel of the UE in the first search space and the second search space, the method further comprises:
the base station sending downlink control channel information to the UE in the first search space and/or the second search space.

6. The method according to claim 5, wherein before the base station sends downlink control channel information to the UE in the first search space and/or the second search space, the method further comprises:
the base station merging downlink control information formats which carry the downlink control channel information.

7. The method according to claim 1, wherein the step of the UE detects the downlink control channel in the first search space and/or the second search space comprises:
the UE using a configuration of {a, b, c, d} as the number of PDCCH candidates to detect PDCCH, wherein a, b, c and d are all positive integers and a+b+c+d is less than or equals 8.

8. The method according to claim 1, wherein the UE uses a configuration of {3, 3, 1, 1} as the number of PDCCH candidates to detect the PDCCH.

9. The method according to claim 1, wherein the UE detects the downlink control channel in the first search space and/or the second search space, comprises:
the UE using a configuration of {a, b, c, d} as the number of PDCCH candidates to detect the PDCCH in the first search space or the second search space, and using a configuration of {6, 6, 2, 2} as the number of PDCCH candidates to detect the PDCCH in another search space;
or the UE using a configuration of {a, b, c, d} as the number of PDCCH candidates to detect the PDCCH when detecting the DCI format 1A and the DCI format 0, and using a configuration of {6, 6, 2, 2} as the number of PDCCH candidates to detect the PDCCH when detecting other DCI formats except for the DCI format 1A and the DCI format 0;
or the UE using a configuration of {a, b, c, d} as the number of PDCCH candidates to detect the POOCH when detecting the DCI formats except for the DCI formats 0 and 1A, and using a configuration of {6, 6, 2, 2} as the number of PDCCH candidates to detect the PDCCH when detecting the DCI format 1A and the DCI format 0.

10. The method according to claim 1, wherein the step of the UE detects the downlink control channel in the first search space and/or the second search space comprises:
the UE using a configuration of {e, f} as aggregation level to detect the PDCCH, where e and f are both positive integers, and the values of e and f belong to a set {1, 2, 4, 8}.

11. The method according to claim 1, wherein the step of the UE detects the downlink control channel in the first search space and/or the second search space comprises:
the UE using a configuration of {e, f} as aggregation level to detect the PDCCH in the first search space or the second search space, and using a configuration of {1, 2, 4, 8} as aggregation level to detect the PDCCH in another search space;
or the UE using a configuration of {e, f} as aggregation level to detect the PDCCH when detecting the DCI format 1A and the DCI format 0, and using a configuration of {1, 2, 4, 8} as aggregation level to detect the PDCCH when detecting other DCI formats except for the DCI format 1A and the DCI format 0;
or the UE using a configuration of {e, f} as aggregation level to detect the PDCCH when detecting the DCI formats except for the DCI formats 0 and 1A, and using a configuration of {1, 2, 4, 8} as aggregation level to detect the PDCCH when detecting the DCI format 1A and the DCI format 0.

12. A User Equipment (UE), comprising:
a detection module, configured to detect the downlink control channel of the UE in a first search space and a second search space, wherein the first search space and the second search space are resources for a base station to send downlink control channel information; and
a hardware processor coupled with a memory, configured to execute the detection module;
wherein both of the first search space and the second search space are UE-specific search spaces, and the first search space is distributed at a subframe or a time slot or a time-frequency location; and the second search space is distributed at another subframe or another time slot or another time-frequency location, wherein a time frequency at which the first search space is located and a time frequency at which the second search space is located can overlap;
wherein the detection module comprises:
a first detection module, configured to use a configuration of {a, b, c, d} as the number of PDCCH candidates to detect the PDCCH, where a, b, c and d are all positive integers and a+b+c+d is less than or equals 8; or
a second detection module, configured to use a configuration of {e, f} as aggregation level to detect the PDCCH, where the values of e and f belong to a set {1, 2, 4, 8}.

13. The user equipment according to claim 12, wherein the detection module comprises:
a first detection module, configured to use a configuration of {a, b, c, d} as the number of PDCCH candidates to detect the PDCCH, where a, b, c and d are all positive integers and a+b+c+d is less than or equals 8.

14. The user equipment according to claim 12, wherein the detection module comprises:
a second detection module, configured to use a configuration of {e, f} as aggregation level to detect the PDCCH, where the values of e and f belong to a set {1, 2, 4, 8}.

15. A base station, comprising:
a sending module, configured to send downlink control channel information to a UE in a first search space and a second search space, wherein the first search space and the second search space are resources for a base station to send downlink control channel information; and
a hardware processor coupled with a memory, configured to execute the sending module;
wherein both of the first search space and the second search space are UE-specific search spaces, and the first search space is distributed at a subframe or a time slot or a time-frequency location; and the second search space is distributed at another subframe or another time slot or another time-frequency location, wherein a time frequency at which the first search space is located and a time frequency at which the second search space is located can overlap;

wherein the sending module comprises:
a first sending sub-module, configured to send a DL grant and a UL grant which is carried by downlink control information format (DCI format) 0 in the first search space and send all the UL grants except for the UL grant carried by the DCI format 0 in the second search space.

16. The base station according to claim 15, wherein the sending module comprises:
a second sending sub-module, configured to send the UL grant and the DL grant which is carried by DCI format 1A in the second search space and send all the DL grants except for the DL grant carried by the DCI format 1A in the first search space.

17. The base station according to claim 15, wherein the base station further comprises:
a merge module, configured to merge downlink control information formats which are used for carrying the downlink control information.

* * * * *